May 15, 1923.
A. CAMERON
AUTOMOBILE RADIATOR THERMOMETER
Filed Sept. 30, 1918
1,455,043
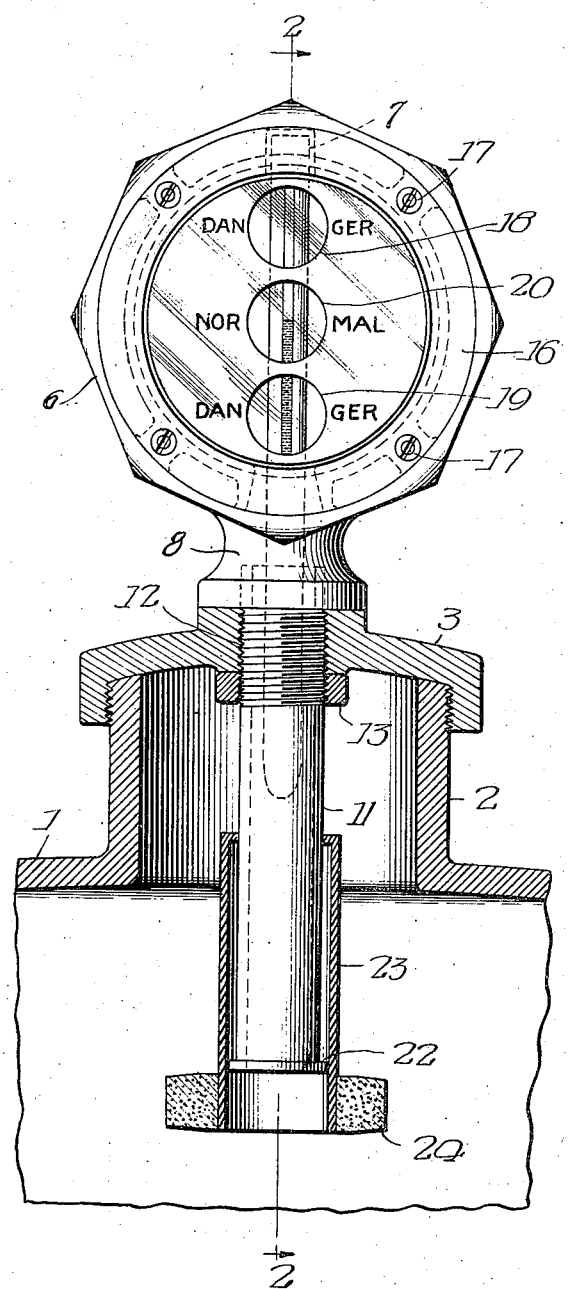
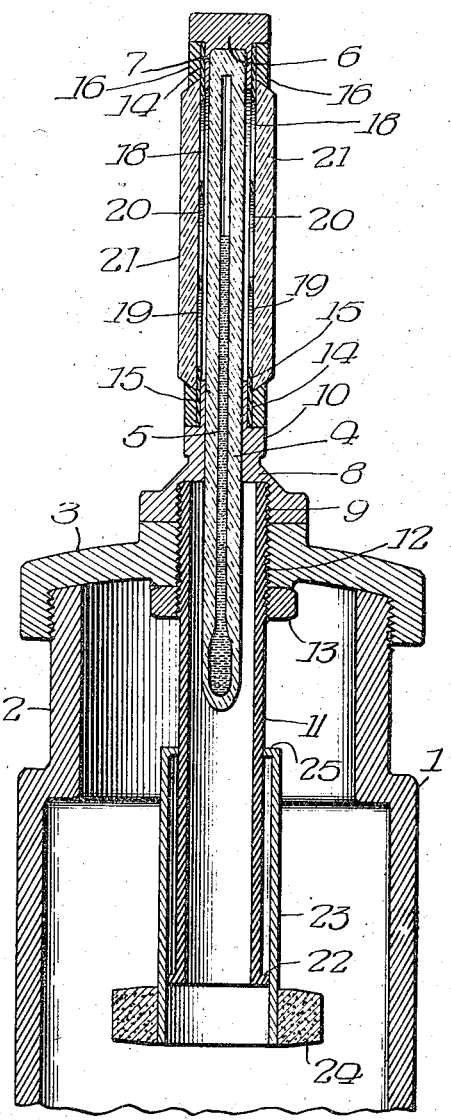
Inventor
Arthur Cameron
By Arthur L. Durand
Atty.

Patented May 15, 1923.

1,455,043

UNITED STATES PATENT OFFICE.

ARTHUR CAMERON, OF CHICAGO, ILLINOIS.

AUTOMOBILE RADIATOR THERMOMETER.

Application filed September 30, 1918. Serial No. 256,333.

*To all whom it may concern:*

Be it known that I, ARTHUR CAMERON, a citizen of the United States of America, and a resident of Chicago, Illinois, have invented a certain new and useful Improvement in Automobile Radiator Thermometers, of which the following is a specification.

This invention relates to thermometers in general, but more particularly to those which are employed on tanks or boilers to indicate the temperature of the contents thereof, and more especially to those which are used on radiators of automobiles.

Generally stated, the object of the invention is to provide certain details and features of construction and combinations tending to increase the general efficiency and the desirability of a thermometer of this general character.

To these and other useful ends the invention consists in matters hereinafter set forth and claimed, and shown in the accompanying drawings, in which—

Fig. 1 is a front elevation of a thermometer embodying the principles of the invention, showing the float member in vertical section, and showing adjacent portions of the automobile radiator in vertical section.

Fig. 2 is a vertical section on line 2—2 in Fig. 1.

As thus illustrated, the automobile radiator 1 has the usual upstanding cylinder portion or boss 2 which is threaded at its upper end to receive the cap or closure 3, this being the provision whereby the radiator is filled with water in the usual or well known manner.

The thermometer comprises a glass tube 4 containing mercury or alcohol or other suitable liquid in the form of a column 5, as is common in thermometers of this type.

The supporting means for the thermometer tube 4 include a ring 6 having its upper portion provided with a socket 7 to receive the upper end of the thermometer tube 4, and the lower portion of the ring has a depending portion or boss 8 which is internally threaded at 9, and which is provided with a vertical bore 10 to accommodate the thermometer tube. A metal tube 11 has its upper end screwed into the threaded bore 12 in the top of the cap or closure 3, and extends upward into the threaded bore 9 of the lower end portion of the ring. A lock-nut 13 is screwed upon the tube 11 to engage the under side of the cap or closure 3, whereby the elements are all clamped tightly together and held in proper position relatively to each other. The ring 6 is formed at both sides with seats 14 for the thin plates 15, and rings 16 one on each side are held in place by screws 17 to clamp the plates tightly in position. Each plate is provided with an upper opening 18 and a lower opening 19, and with an intermediate or middle or opening 20, the three openings being arranged in a vertical row, so that the thermometer tube 4 is exposed at three different points. Glass plates 21 are preferably placed over the metal plates 15, to cover said openings 18, 19 and 20, and these glass plates are held in place by the beveled edges of the rings 16, as shown, in a manner that will be readily understood. The thermometer casing, therefore, is substantially flat at each side, and each face thereof, is round or disk-like in general form. The word "Danger" may be placed adjacent the upper and lower openings 18 and 19, as shown, and the word "Normal" may be placed adjacent the middle opening 20, as shown in the drawings, and in practice one side of the thermometer casing thus constructed faces forward and the other side faces rearward toward the driver.

It will be seen that the lower end portion of the thermometer tube 4 extends downward a distance in the metal tube 11, which latter has a shoulder 22 at its lower end. The float member comprises a cylinder 23 telescoped on the lower end of the tube 11 and provided at its lower end with a cork or other float 24 to rest on the surface of the water. The upper end of the cylinder 23 has a shoulder 25 to rest on the shoulder 22, when the float member reaches the limit of its downward movement, whereby the float member can not be detached.

When the column 5 in the thermometer stands as shown in the drawings, with its upper end opposite the opening 20, the temperature of the water in the radiator is understood to be normal. Suppose, however, that the temperature falls until the upper end of the mercury or other column stands opposite the lower opening 19, thereby indicating that the water has reached, or is about to reach, the freezing point. In such case, the driver or attendant can take the necessary or proper precautions to prevent trouble. On the other hand, if the water becomes too hot, the mercury column then rises until its upper end is opposite the opening 18, which indicates danger from overheating, and the driver or attendant is warned that the temperature must be reduced. The thermometer accurately shows the temperature of the water, as its lower end is enclosed in the tube 11, which latter is some distance from the walls of the radiator, and the float member comprising the cylinder 23 and the float 24 maintains the lower end of this tube in communication with the surface of the water. In this way, practically the exact surface temperature of the water is always indicated by the thermometer.

Of course, whether the float 24 rides on the surface of the water in the radiator depends upon how full the latter is filled. Obviously, the entire pipe connection can be submerged, by filling the radiator so full that the water comes to the top of the boss or inlet portion 2, but as the water falls, owing to leakage or evaporation, the float 24 will finally rest on the surface of the water and move downward therewith if the level of the water continues to fall.

What I claim as my invention is:—

1. In a thermometer construction for the radiators of automobiles, the combination of a tube depending therein above the water, means to support the tube, a float member forming an extension of the lower end of said tube, said member and the tube being telescoped together, so that the lower end of the float member will always rest on the surface of the water, and a thermometer disposed in operative relation to the upper end of said tube, so that heat rising in the tube from the water will operate said thermometer.

2. A structure as specified in claim 1, said float member consisting of a cylinder slidable on the outer surface of the lower end portion of said tube, with a float fixed to the lower end of said cylinder.

3. A structure as specified in claim 1, having a radiator top closure in which the upper end of said tube is secured, and means to removably support said thermometer on said closure, with the lower portion of said thermometer extending downwardly into said tube.

4. In a radiator thermometer, a depending tube, means to support the upper end of the tube in the radiator cap, an extension for the lower end of said tube, movable up or down to in effect lengthen and shorten the tube, a float on the extension, and a thermometer in communication with the upper end of said tube, so that heat rising in the tube will operate said thermometer.

5. In a temperature indicator, a movable pipe having an opening and a float at the lower end thereof, means to maintain said pipe in such position above the surface of a body of heated liquid that said float will rest on said surface and rise and fall therewith, to keep said opening at the surface of the liquid, a thermometer for indicating the temperature of said liquid, and means for supporting said thermometer in position to receive the heat conducted thereto through said pipe.

ARTHUR CAMERON.